Figure 1:
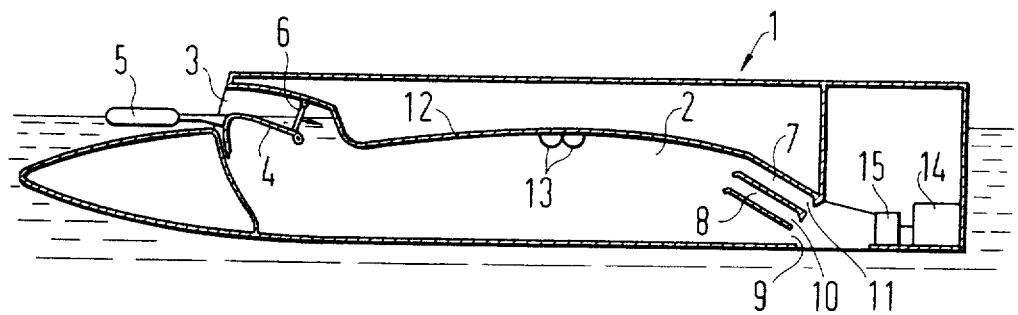

United States Patent [19]
Rafael

[11] 3,875,062
[45] Apr. 1, 1975

[54] DEVICE FOR CLEANING WATER POLLUTED BY OIL

[76] Inventor: Johann Rafael, Maxstrasse 36, Salzburg, Austria

[22] Filed: Sept. 25, 1973

[21] Appl. No.: 400,633

[30] Foreign Application Priority Data
Sept. 25, 1972 Germany............................ 2246958

[52] U.S. Cl.......................... 210/242, 210/DIG. 21
[51] Int. Cl............................................. E02b 15/04
[58] Field of Search................ 210/83, 242, DIG. 21

[56] References Cited
UNITED STATES PATENTS

| | | | |
|---|---|---|---|
| 3,615,017 | 10/1971 | Valdespino | 210/DIG. 21 |
| 3,653,510 | 4/1972 | Fitzgerald | 210/DIG. 21 |
| 3,664,505 | 5/1972 | Brittingham | 210/DIG. 21 |
| 3,715,034 | 2/1973 | Ivanoff | 210/242 |

*Primary Examiner*—Theodore A. Granger
*Attorney, Agent, or Firm*—Fleit & Jacobson

[57] ABSTRACT

A buoyant cleaning device for water polluted by oil, comprising a collecting chamber for the polluted water, the collecting chamber having a cover which is so arched that the oil accumulates preferably in the range of the highest point of the arch and an oil-removal feature is provided at said highest point of the arched cover.

6 Claims, 2 Drawing Figures

DEVICE FOR CLEANING WATER POLLUTED BY OIL

The invention relates to a device for cleaning water polluted by oil, comprising a floating body which contains an inlet opening and a collecting chamber for the polluted water. In so-called cleaning ships the oil-polluted water is guided into a collecting chamber where it will be calmed down so that the oil floating on the surface of the water can be skimmed off. When the ship is moving considerably and the surge is strong, it is not possible, however, in conventional cleaning ships to calm the water down fully, especially in the surface area of the water. As it it not possible when the ship is moving considerably to establish an absolutely calm water surface in the collecting chamber, great difficulties arise in removing the oil from the surface of the water in the collecting chamber.

The object of the invention is therefore to provide collecting chamber in which even when the surge and the ship's movements are violent the oil accumulates on the surface of the polluted water and said surface is kept so calm that the oil floating at the top can be removed easily.

In a device of the type named at the beginning this object is achieved in accordance with the invention in that the collecting chamber is furnished with a cover in such a manner that the water surface polluted by oil comes fully or partly into contact with the cover and an oil-removal feature is provided at the cover.

The cover may be advantageously arched and the removal features can be provided in the range of the highest point of the arch. This means that the layer of oil will accumulate preferably at the highest point of the arch. The oil-removal feature may be designed in the form of a discharge channel or suction facility.

It is preferable to keep the inside of the cover below the minimum height of the inlet opening. The collecting chamber is designed as a duct. In the flow direction of the water the rear end of the collecting chamber can be connected to two ducts through which the water on the surface flows out of the collecting chamber. The outlet ends of these ducts are constricted to a slit so that the speed of the emerging surface layer of the water is reduced and residual oil particles dragged along the roof of the ducts rise upwards. This arrangement means that oil particles that are dragged along rise more quickly than the water flows in the ducts.

It is now possible to equip the device according to the invention with a drive system so that it can be employed as an independent cleaning ship. For large-scale operations, however, it is advantageous to connect together several floating bodies furnished with covered collecting chambers in hinged fashion so that the floating bodies come to rest in one row next to each other and so that the row of adjacent floating bodies is matched to the surge of the water to be cleaned. For this purpose the row of floating bodies can be suspended from a crane-type outrigger which is hinged to the ship's body of a receiving ship. The cleaning ship bodies can be placed on the water and lifted up from there again and deposited on the receiving ship's body by swivelling the crane-type outrigger.

The invention is explained in more detail with reference to embodiments and the attached drawings.

Figure 2:
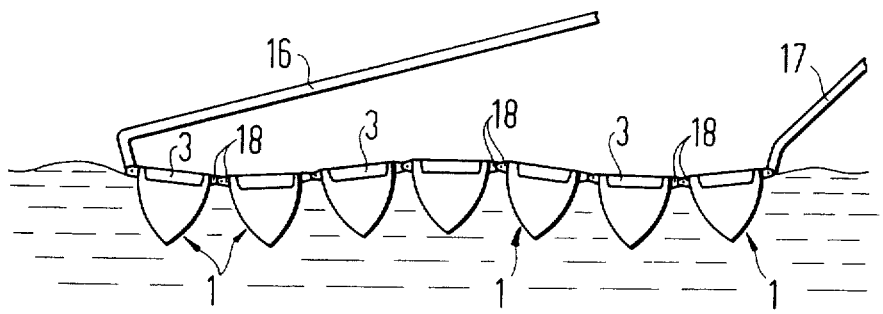

FIG. 1 shows a side sectional view of a device for cleaning water polluted by oil; and FIG. 2 shows a row of several adjacent floating bodies with covered collecting chambers which are suspended from crane-type outriggers.

The device according to the invention has a floating body 1 which contains a collecting chamber 2. Looking in the direction of flow of the water, an inlet opening 3 is provided at the front side of the floating body. In inlet opening 3 there is a skimming body 4 which has at its front side one or more floating bodies 5. The thickness of the water layer to be skimmed off is adjusted by skimming body 4. Inlet opening 3 is furthermore equipped with a flap 6 which can be opened only in the direction of the polluted, inflowing water. Flap 6 prevents polluted water from leaving collecting chamber 2 again through inlet opening 3. At the rear end of the collecting chamber which may be designed as a duct, there are two more ducts 7 and 8 through which water can flow out from the surface of the water in the collecting chamber. Ducts 7 and 8 are furnished with constricted outlet openings 10 and 11. Collecting chamber 2 is equipped with a cover 12 arching upwards. At the highest point of the arch there is a removal feature 13 which takes the form of discharge channels. The oil to be removed accumulates in the range of the highest point of the arch, just like an air bubble does in a spirit level. The height of the highest point of the upwardly arched cover 12 of collecting chamber 2 is lower than the skimming height of skimming body 4 in inlet opening 3 of the ship.

Even when the ship is moving considerably, the surface of the polluted water is kept calm because it does not represent a free surface but is kept at rest by the arched cover of the collecting chamber. The oil accumulating at the highest point of the cover is guided through discharge channels 13 into a settling bunker or some other type of deposit chamber where the final separation process can take place.

Both ducts 7 and 8 extend across the entire width of collecting chamber 2. Thanks to the constricted outlet openings 10 and 11 in these ducts the speed of the emerging surface layer of the water is throttled so much that oil particles that have been dragged along rise more quickly than the water flows between the walls of these two ducts. This leads to the separation of oil residue. This oil residue can be sucked out of the ducts or removed in some other manner. The clean water flows through the constricted outlet openings 10 and 11 and is mixed with the remainder of the clean water which leaves collecting chamber 2 through outlet opening 9. The clean water is conveyed by pump 14 out of the ship's body. A valve 15 is furthermore provided between outlet openings 9, 10, 11 and pump 14. This enables the ship to be pumped absolutely empty so that it can be made lighter for manoeuvring.

FIG. 2 shows several ship's bodies which are arranged adjacently to each other in hinged fashion and have covered collecting chambers in accordance with the invention. Said ship's bodies can be put on the water by crane-type outriggers 16 and 17 which are mounted on a receiving ship's body. The ship's bodies are so connected together in hinged fashion that they can adapt themselves to the wave motions of the water to be cleaned. Connecting points 18 of the floating bodies are designed in such a manner that they allow the floating bodies to pivot around their transverse and longitudinal axes.

I claim:

1. A device for cleaning water polluted by oil, comprising a floating body which contains an inlet opening and a collecting chamber for the polluted water, the collecting chamber having a cover and the water surface polluted by oil inside the collecting chamber being fully or partly in contact with the cover, the cover being so arched that the oil accumulates preferably at the highest point of the arch where oil removal means is provided at the cover, the inside of the cover being below the minimum skimming height of the inlet opening.

2. The device of claim 1, wherein the oil-removal means is designed as a discharge channel or suction facility.

3. The device of claim 1, wherein the collecting chamber is designed as a duct.

4. The device of claim 1, wherein in the flow direction of the water the rear end of the collecting chamber is connected to two ducts through which the water flows out of the collecting chamber, the outlet ends of said ducts being constricted to a slit so that the speed of the emerging surface layer of the water is reduced and residual oil particles dragged along the roof of the ducts rise upwards.

5. The device of claim 1, wherein several floating bodies equipped with covered collecting chambers are so connected together in hinged fashion that the floating bodies come to rest in one row next to each other and the row of adjacent floating bodies can adapt itself to the surge of the water to be cleaned.

6. The device of claim 5, wherein the row of floating bodies is suspended from crane-type out-riggers which are hinged onto a receiving ship's body.

* * * * *